United States Patent
Asahara et al.

(10) Patent No.: US 9,289,871 B2
(45) Date of Patent: Mar. 22, 2016

(54) WORKPIECE RECOVERY UNIT

(75) Inventors: Noriyuki Asahara, Asaka (JP); Hiroshi Kasuya, Iruma (JP); Kyota Kotake, Tokorozawa (JP); Yoshiki Sugimoto, Tokorozawa (JP)

(73) Assignees: CITIZEN HOLDINGS CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 172 days.

(21) Appl. No.: 14/008,472

(22) PCT Filed: Feb. 22, 2012

(86) PCT No.: PCT/JP2012/054196
§ 371 (c)(1),
(2), (4) Date: Sep. 27, 2013

(87) PCT Pub. No.: WO2012/132648
PCT Pub. Date: Oct. 4, 2012

(65) Prior Publication Data
US 2014/0015182 A1 Jan. 16, 2014

(30) Foreign Application Priority Data
Mar. 28, 2011 (JP) .................................. 2011-069977

(51) Int. Cl.
*B23Q 7/00* (2006.01)
*B23Q 7/04* (2006.01)
*B23Q 11/08* (2006.01)

(52) U.S. Cl.
CPC *B23Q 7/00* (2013.01); *B23Q 7/008* (2013.01); *B23Q 7/04* (2013.01); *B23Q 11/08* (2013.01)

(58) Field of Classification Search
CPC .......... B23Q 7/008; B23Q 7/00; B23Q 7/048; B23Q 11/08; B23Q 7/12
See application file for complete search history.

(56) References Cited

U.S. PATENT DOCUMENTS

| 2004/0060402 | A1* | 4/2004 | Shimada et al. | ................. 82/124 |
| 2009/0151524 | A1* | 6/2009 | Hioki et al. | ..................... 82/124 |
| 2009/0260492 | A1* | 10/2009 | Maehara et al. | ................. 82/152 |

FOREIGN PATENT DOCUMENTS

| CN | 1880011 A | 12/2006 |
| CN | 101528410 A | 9/2009 |

(Continued)

OTHER PUBLICATIONS

The extended European search report issued by the European Patent Office on Feb. 2, 2015, which corresponds to European Patent Application No. 12762997.0-1702 and is related to U.S. Appl. No. 14/008,472.

(Continued)

*Primary Examiner* — Lee D Wilson
*Assistant Examiner* — Henry Hong
(74) *Attorney, Agent, or Firm* — Studebaker & Brackett PC

(57) ABSTRACT

To prevent entrance of swarf or cutting oil from a workpiece recovery opening, in a workpiece recovery unit, a cover 21 which covers an upper side and a lateral side of a workpiece recovery opening 19 opening in an upper side of a workpiece recovery section 18 disposed lateral to a holder 13 which holds a processed workpiece 1', a workpiece transport path 23 from an entrance 22 opening in a lower side provided in the cover 21 to the recovery opening 19 is formed in a step-like shape, the holder 13 is supported so as to be movable in an up-and-down direction and a right-and-left direction, the workpiece 1' is moved along the transport path 23 by the holder 13, and is transported to the upper side of the recovery opening 19 from the entrance 22 so as to be recovered in the recovery opening 19.

5 Claims, 4 Drawing Sheets

(56) References Cited

FOREIGN PATENT DOCUMENTS

| EP | 1402998 A2 | 3/2004 |
| EP | 1518639 A2 | 3/2005 |
| JP | H05-041605 U | 6/1993 |
| JP | 2000-126972 A | 5/2000 |
| JP | 2002-178238 A | 6/2002 |
| JP | 2004-114226 A | 4/2004 |
| JP | 2009-142920 A | 7/2009 |
| WO | 2008/054018 A1 | 5/2008 |

OTHER PUBLICATIONS

International Search Report; PCT/JP2012/054196; Apr. 17, 2012.

* cited by examiner

WORKPIECE RECOVERY UNIT

TECHNICAL FIELD

The present invention relates to a workpiece recovery unit.

BACKGROUND ART

A workpiece recovery unit including a holder, which holds a processed workpiece, and a recovery section for a material, which is disposed laterally to the holder, is conventionally known (refer to Patent Document 1, for example). In such a workpiece recovery unit, the holder is provided so as to be movable toward the recovery section, the workpiece is transported to the recovery section by the movement of the holder, and the processed workpiece is recovered in the recovery section.

RELATED ART DOCUMENT

Patent Document

Patent Document 1: JP 2000-126972A

SUMMARY OF INVENTION

Technical Problem

However, such a workpiece recovery unit has a problem in that swarf or cutting oil while processing a workpiece easily enters the recovery section because the recovery section has an opening in the upper side thereof, and the workpiece is recovered in the recovery section through the opening.

Solution to Problem

To solve the above problem, first, a workpiece recovery unit of the present invention includes a holder which holds a processed workpiece, and a workpiece recovery section disposed lateral to the holder; wherein the recovery section includes a workpiece recovery opening which opens in an upper side thereof, the holder is provided so as to be movable toward the recovery section, the workpiece is transported to the recovery section to be recovered through the recovery opening, the recovery section is provided with a cover which covers the upper side and a lateral side of the recovery opening, the cover is provided with an entrance which opens downwardly, a workpiece transport path from the entrance to the recovery opening is formed in a step-like shape, the holder is supported so as to be movable in an up-and-down direction and a right-and-left direction to be moved along the transport path, and the workpiece is transported to the upper side of the recovery opening from the entrance by the holder to be recovered in the recovery opening.

Second, the holder comprises a spindle of a machine tool.

Third, the machine tool includes two spindles which are opposed to each other to transfer the workpiece, the holder comprises one of the spindles, and the recovery section is provided such that the recovery opening is disposed in a position higher than that of a shaft center of the two spindles when transferring the workpiece.

Effect of Invention

According to the workpiece recovery unit of the present invention as described above, the entrance of swarf, cutting oil or the like in the recovery opening from the upper side and the lateral side can be prevented by the cover. Thus, the processed workpiece can be stably transported by the holder, and can be recovered.

In addition, since the holder is made of the spindle of the machine tool, it becomes unnecessary to further provide another holder. Specifically, since the gripper is made of one of the two spindles which are opposed to each other to transfer the workpiece, and the recovery section is provided such that the recovery opening is disposed in a position higher than that of the shaft center of both spindles when transferring the workpiece, the entrance of swarf, cutting oil or the like while processing a workpiece can be effectively prevented.

DESCRIPTION OF EMBODIMENT

One embodiment of a workpiece recovery unit of the present invention will be described with reference to an example of an automatic lathe, which is a machine tool including the workpiece recovery unit of the present invention.

Figure 1:
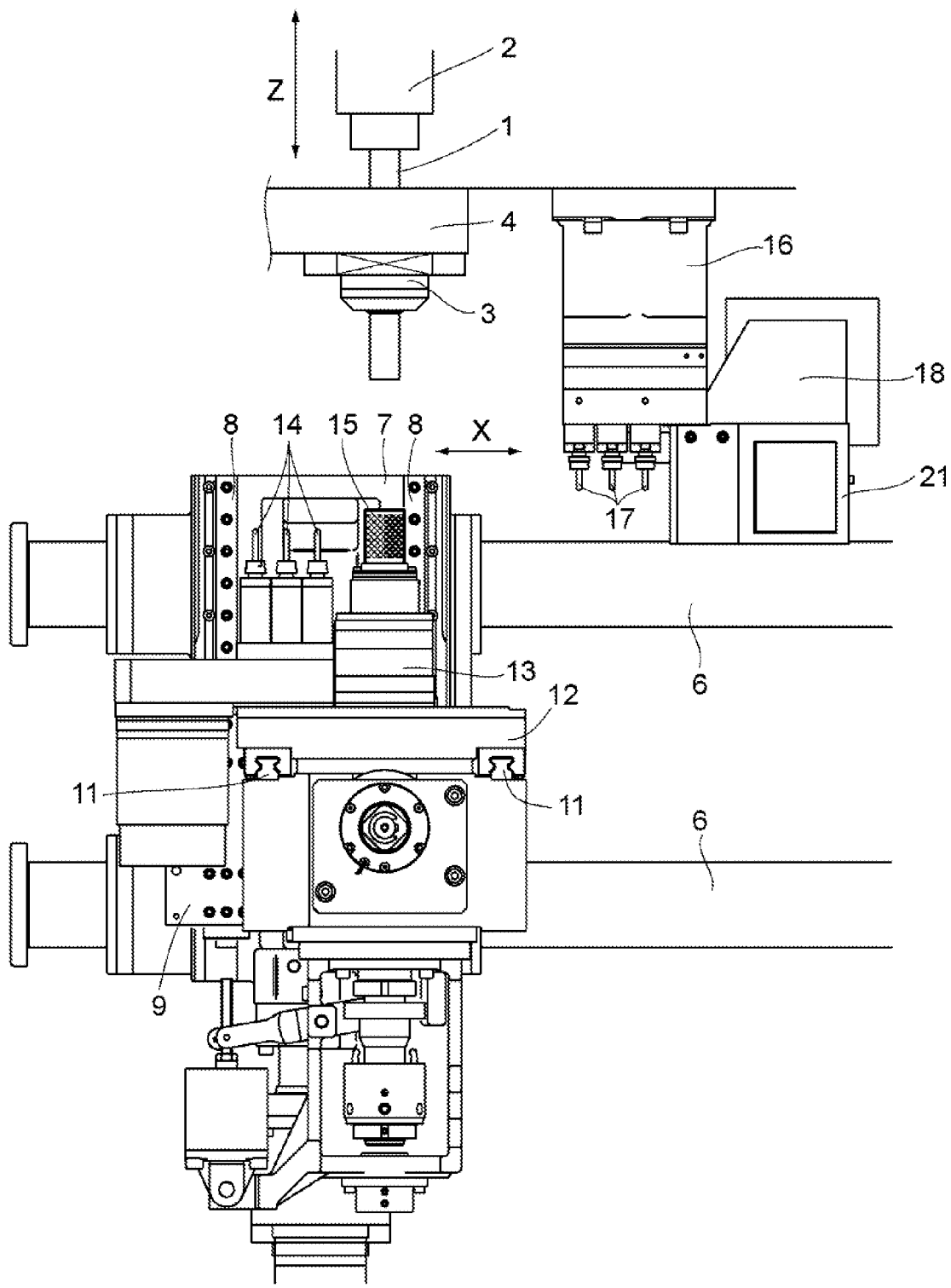
FIG. 1 is a plan view of a main part of an automatic lathe including a workpiece recovery unit of the present invention.

As illustrated in FIG. 1, the automatic lathe includes a front spindle 2 which detachably grips a workpiece 1. The front spindle 2 is supported so as to be rotatable about a shaft center and slidable in the axis line direction (Z-axis direction). A guide bush 3 through which the workpiece 1 gripped by the front spindle 2 is inserted is disposed in front of the front spindle 2.

The guide bush 3 is mounted on a guide bush support base 4, and guides the workpiece 1 so as to be rotatable and slidable along the Z-axis direction. The guide bush support base 4 is fastened on a bed of the automatic lathe. An X slide rail 6 extending along the X-axis direction orthogonal to the Z-axis direction in the right-and-left direction is provided in front of the guide bush 3 on the bed. An X slide base 7 is mounted on the X slide rail 6 so as to be slidable along the X-axis direction.

A Z slide rail 8 extending along the Z-axis direction is provided in the X slide base 7 side. A Z slide base 9 is mounted on the Z slide rail 8 so as to be slidable along the Z-axis direction.

A Y slide rail 11 extending along the Y-axis direction (refer to FIG. 2) orthogonal to the X-axis direction and the Z-axis direction in the up-and-down direction is provided in the Z slide base 9 side. A support base 12 is mounted on the Y slide rail 11 so as to be slidable along the Y-axis direction.

A back spindle 13 is supported by the support base 12 so as to be rotatable about the shaft center, and opposed to the front spindle 2. The back spindle 13 is configured to grip the workpiece 1 in a detachable manner.

The support base 12 is provided with a front processing tool 14 which processes the workpiece 1 gripped by the front spindle 2. The support base 12 is located in the lateral position of the back spindle 13. In this embodiment, the front processing tool 14 is a tool line in which a plurality of tools are disposed along the X-axis direction, and a plurality of tool lines are arranged along the Y-axis direction.

Each of the front processing tools 14 and the back spindle 13 integrally slide along the X-axis direction, Z-axis direction and Y-axis direction with the above configuration.

A back tool post 16 is fastened on the bed side in the lateral position of the guide bush 3. A back processing tool 17 which processes the workpiece 1 gripped by the back spindle 13 is attached to the back tool post 16.

In this embodiment, the back tool post 16 is configured such that a plurality of back processing tools 17 is disposed along the X-axis direction as a tool line, and a plurality of tool lines is arranged along the Y-axis direction.

The automatic lathe is configured to select a predetermined front processing tool 14 by the movement of the support base 12 along the Y-axis direction and the movement of the X slide base 7 along the X-axis direction, and process a part of the workpiece 1 projected from the guide bush 3, which is gripped by the front spindle 2, by the selected front processing tool 14. The workpiece 1 can be transferred between the front spindle 2 and the back spindle 13 by moving the support base 12 such that the front spindle 2 and the back spindle 13 are concentrically disposed.

By transferring the workpiece 1, the processed workpiece 1 gripped by the front spindle 2 can be delivered to the back spindle 13. A predetermined back processing tool 17 is selected by the movement of the support base 12 along the Y-axis direction and the movement of the X slide base 7 along the X-axis direction, and the workpiece 1 gripped by the back spindle 13 can be processed with the selected back processing tool 17 by the movement of the support base 12. For example, the processed workpiece 1' gripped by the front spindle 2 can be gripped by the back spindle 13 so as to be further processed.

However, in the present embodiment, a workpiece recovery basket 15 which receives the workpiece 1' processed by the front spindle 2 is integrally fastened to the back spindle 13, so that the workpiece 1' is not processed by the back spindle 13.

Figure 3:
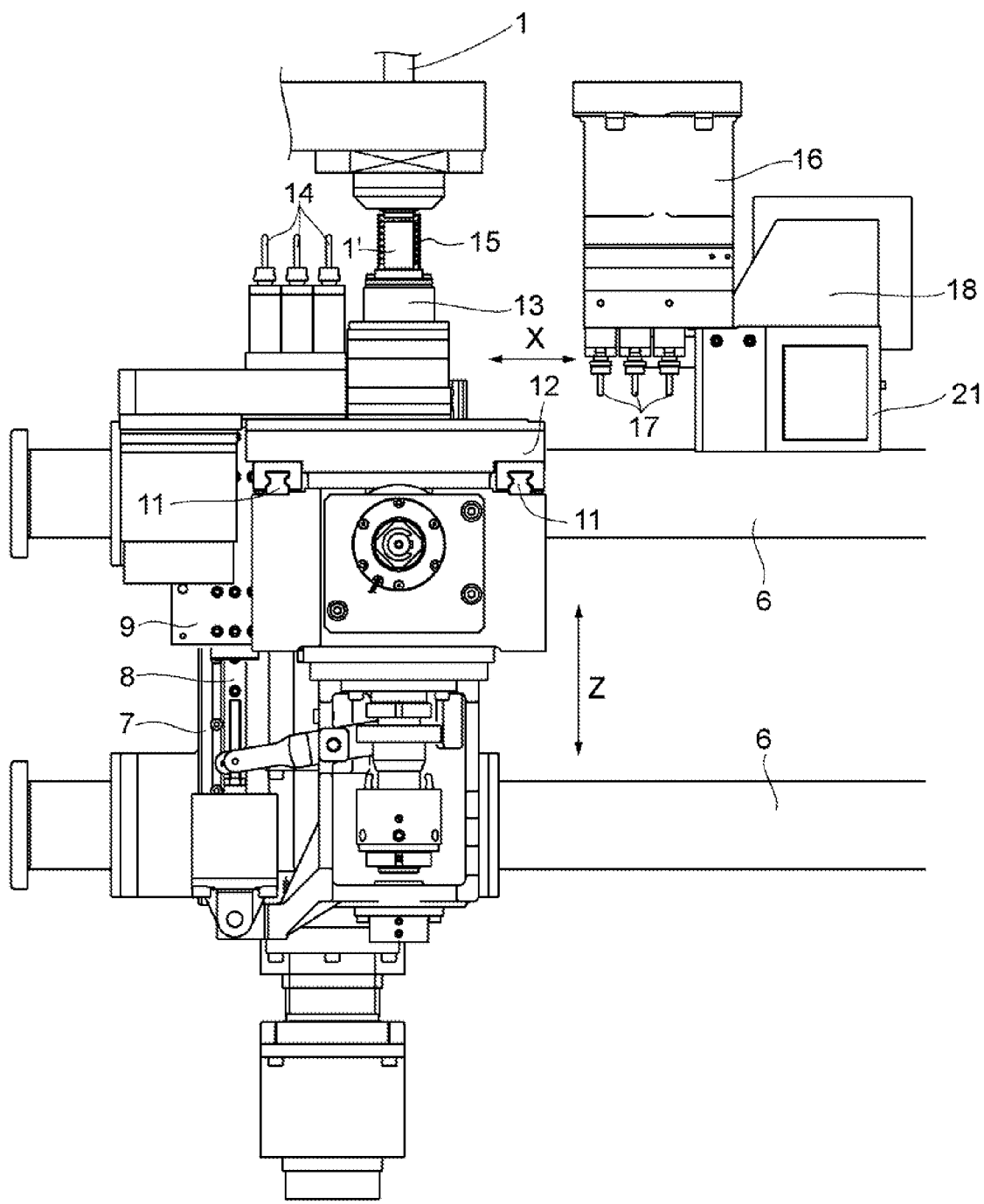
FIG. 3 is a plan view of the substantial part of the automatic lathe in which a processed workpiece is received in a workpiece recovery basket from a front spindle.

As illustrated in FIG. 3, the back spindle 13 is brought close to the front spindle 2 so as to be concentric with the front spindle 2, and the processed workpiece 1' obtained by cutting the workpiece 1 is received in the workpiece recovery basket 15 so as to be held in the back spindle 13.

A chute 18 which recovers the processed workpiece 1' held in the back spindle 13 is provided lateral to the back processing tool 17. The chute 18 is fastened to the back tool post 16. The chute 18 can be easily mounted by removing a part of the back processing tool 17 from the back tool post 16, and using the mounted portion of the back processing tool 17 of the back tool post 16.

The chute 18 is formed in a box shape having in the upper side thereof an opening, and the opening constitutes a recovery opening 19. By dropping the workpiece 1' in the recovery opening 19, the workpiece 1' can be recovered in the chute 18. The chute 18 is disposed such that the recovery opening 19 is located in a position higher than that of the shaft center when transferring the workpiece 1 between the back spindle 13 and the front spindle 2.

A cover 21 which covers the upper side and the lateral side of the recovery opening 19 is fastened to the chute 18. A part of the lateral side of the cover 21, which is opposed to the back spindle 13, opens to allow at least the passage of the workpiece recovery basket 15 as the after-described transport path 23.

A lateral portion 21a of the cover 21 on the back spindle 13 side extends to the neighborhood of the back processing tool 17 toward the guide bush 3 through the area over the recovery opening 19, and the leading end portion of the extended portion inclines oblique downward. An entrance 22, which is divided by the leading end portion and the upper edge of the chute 18 and opens downward, is formed.

In the present embodiment, the entrance 22 is formed in the oblique downward direction. The transport path 23 for transporting the processed workpiece 1' is formed from the entrance 22 to the upper side position of the recovery opening 19.

In the present embodiment, the transport path 23 includes an oblique upward straight inclination path 23a from the end of the entrance 22 to the lateral side of the recovery opening 19 and an approximate horizontal path 23b from the end of the inclination path 23a to the upper side of the recovery opening 19. The transport path 23 is formed in a step-like path from the entrance 22 to the upper side position of the recovery opening 19 to have a space which allows at least the passage of the workpiece recovery basket 15.

The height of the shaft center of the front spindle 2 is set so as to be substantially the same as that of the end of the inclination path 23a. The back spindle 13 moves toward the end of the inclination path 23a along the approximate horizontal path 25 upon the reception of the processed workpiece 1' from the front spindle 2.

Figure 2:
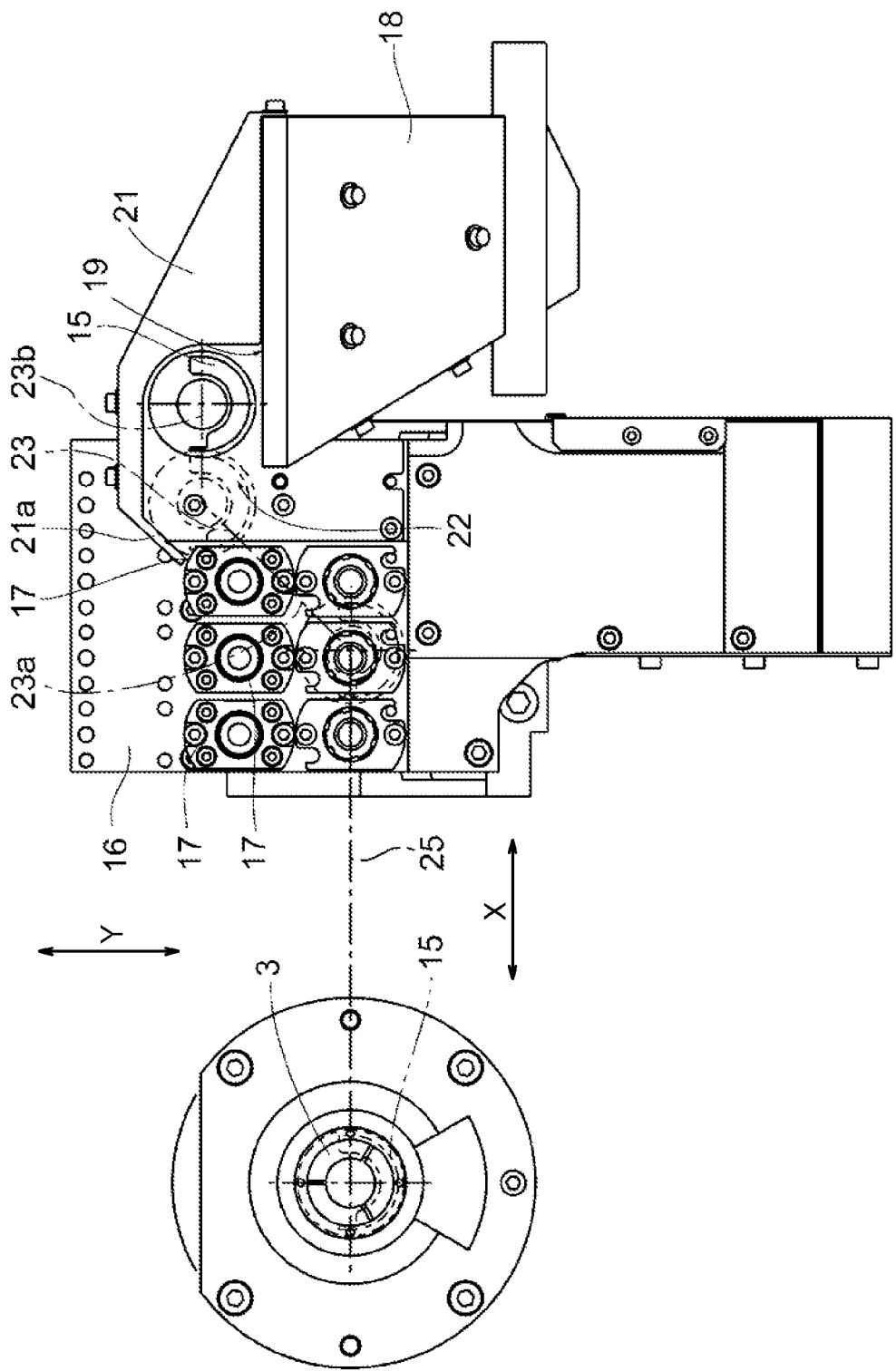
FIG. 2 is a front view of the substantial part of the automatic lathe including the workpiece recovery unit of the present invention.
Figure 4:
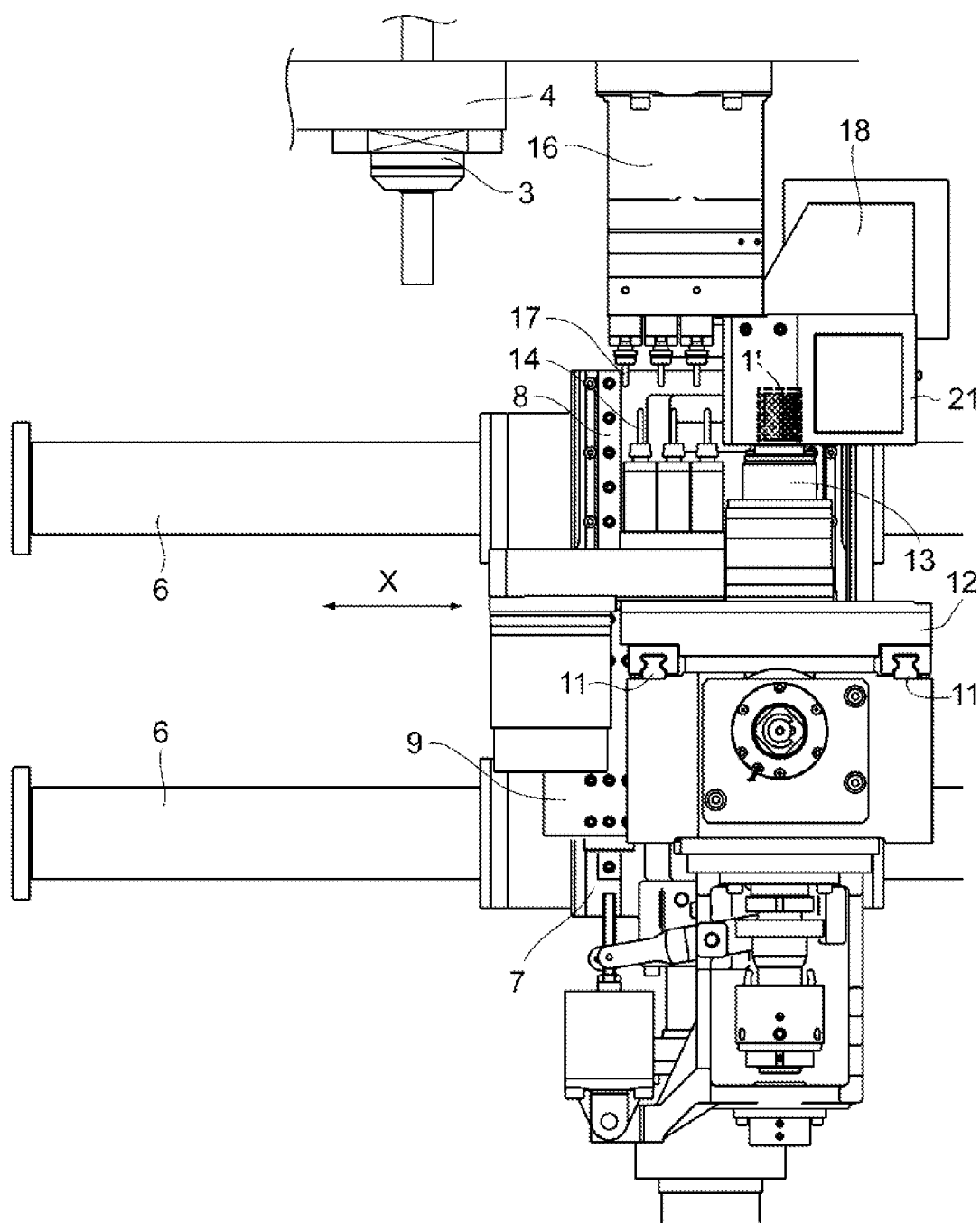
FIG. 4 is a plan view illustrating the substantial part of the automatic lathe in which the processed workpiece is transported above a chute.

As illustrated in FIGS. 2, 4, after the workpiece recovery basket 15 is moved toward the end of the inclination path 23a along the path 25 by the movement of the support base 12, the back spindle 13 is moved oblique upward along the inclination path 23a.

The workpiece recovery basket 15 is introduced in the cover 21 through the entrance 22 in the middle of the inclination path 23a, and is moved to the upper side of the recovery opening 19 along the horizontal path 23b, so that the workpiece 1' held in the back spindle 13 can be transported.

By rotating the back spindle 13 with the workpiece recovery basket 15 being located above the recovery opening 19, the workpiece 1' housed in the workpiece recovery basket 15 is dropped in the recovery opening 19 so as to be recovered in the chute 18. In addition, since a part of the lateral side of the cover 21, which is opposed to the back spindle 13, opens, the movement of the back spindle 13 cannot be disturbed.

In the automatic lathe, the workpiece recovery unit includes the back spindle 13 as a holder which holds the processed workpiece 1' and the chute 18 as a recovery section.

In the workpiece recovery unit, the entrance of swarf, cutting oil or the like in the recovery opening 19 from the upper side and the lateral side can be prevented by the cover 21. Therefore, the processed workpiece 1' can be stably transported and recovered by the back spindle 13.

Since the transport path 23 is a combination of the straight paths, the cover 21 and the transport path 23 can be simplified, and the entrance of swarf or cutting oil in the recovery section 18 can be prevented with a simple configuration.

Moreover, the processed workpiece 1' can be transported along the transport path 23 and the path 25, so that the movement stroke along the Z-axis direction of the support base 12 can be controlled; thus, the automatic lathe can also be downsized. With the back processing tool 17 located below the entrance 22 being unmounted, the back spindle 13 can be quickly brought close to the back tool post 16, and the workpiece 1' can be transported in the chute 18. The movement stroke of the support base 12 along the Z-axis direction can be therefore further reduced.

In addition, without mounting the work recovery basket 15 in the back spindle 13, the workpiece processed in the front spindle 2 can be gripped by the back spindle 13 so as to be transferred, and the processed workpiece 1' can be transported to the upper side of the recovery opening 19 while gripping the processed workpiece 1' by the back spindle 13 so as to be recovered in the chute 18. In this case, the workpiece 1' processed in the front spindle 2 is gripped by the back spindle 13 so as to be further processed, and the further processed workpiece 1' gripped by the back spindle 13 can be recovered in the chute 18.

The transport path 23 can be obtained by the combination of paths along a vertical line or a circular arc line according to a shape of the cover 21 or a shape of a structure around the cover 21 in addition to the combination of the straight inclination path 23a and the approximate horizontal path 23b.

The entrance 22 opens in the vertical downward direction. With this configuration, the transport path can be constituted by the combination of the horizontal path and the vertical line path. In this case, the lateral side of the recovery opening 19 can be almost completely covered by the cover 21. As such, the entrance of scattering swarf, cutting oil or the like in the recovery opening 19 can be reduced.

CROSS REFERENCE TO RELATED APPLICATION

The present application is based on and claims priority from Japanese Patent Application No. 2011-069977, filed on Mar. 28, 2011, the disclosure of which is hereby incorporated by reference in its entirety.

DESCRIPTION OF REFERENCE NUMERALS

1' processed workpiece
13 back spindle (holder)
18 chute (recovery section)
19 recovery opening
21 cover
22 entrance
23 transport path

The invention claimed is:

1. A workpiece recovery unit, comprising:
a holder which holds a processed workpiece; and
a workpiece recovery section disposed lateral to the holder; wherein
the recovery section includes a workpiece recovery opening, which opens in an upper side thereof,
the holder is provided so as to be movable toward the recovery section,
the workpiece is transported to the recovery section so as to be recovered through the recovery opening,
the recovery section is provided with a cover which covers the upper side and a lateral side of the recovery opening,
the cover is provided with an entrance which opens downwardly,
a workpiece transport path includes an inclination path extending through the entrance and a horizontal path extending from an end of the inclination path to an upper side position of the recovery opening,
the holder is supported so as to be movable in an up-and-down direction and a right-and-left direction so as to be moved along the transport path,
the workpiece is transported to the upper side of the recovery opening from the entrance by the holder so as to be recovered in the recovery opening, and
the cover has a lateral portion having a leading end portion that inclines oblique downward.

2. The workpiece recovery unit according to claim 1, wherein the holder comprises a spindle of a machine tool.

3. The workpiece recovery unit according to claim 2, wherein
the machine tool includes two spindles which are opposed to each other to transfer the workpiece,
the holder comprises one of the spindles, and
the recovery section is provided such that the recovery opening is disposed in a position higher than that of a shaft center of the two spindles when transferring the workpiece.

4. The workpiece recovery unit according to claim 1, wherein the recovery section is formed in a box shape having the workpiece recovery opening in the upper side.

5. The workpiece recovery unit according to claim 1, wherein the cover is fastened to the recovery section.

\* \* \* \* \*